United States Patent
Moon et al.

(10) Patent No.: US 7,148,317 B2
(45) Date of Patent: Dec. 12, 2006

(54) METHOD OF PREPARING CATALYST FOR POLYMERIZATION OF ALIPHATIC POLYCARBONATE AND METHOD OF POLYMERIZING ALIPHATIC POLYCARBONATE USING SAME

(75) Inventors: Seung-Jae Moon, Pohang (KR); Moon-Hor Ree, Pohang (KR); Jong-Sung Kim, Pohang (KR); Kie-Soo Kim, Pohang (KR)

(73) Assignees: Posco, Pohang-shi (KR); Postech Foundation, Pohang-shi (KR)

( * ) Notice: Subject to any disclaimer, the term of this patent is extended or adjusted under 35 U.S.C. 154(b) by 13 days.

(21) Appl. No.: 10/519,177

(22) PCT Filed: Jun. 19, 2003

(86) PCT No.: PCT/KR03/01212

§ 371 (c)(1),
(2), (4) Date: Dec. 20, 2004

(87) PCT Pub. No.: WO04/000912

PCT Pub. Date: Dec. 31, 2003

(65) Prior Publication Data

US 2005/0272904 A1    Dec. 8, 2005

(30) Foreign Application Priority Data

Jun. 20, 2002    (KR) ............... 10-2002-0034519

(51) Int. Cl.
  *C08G 59/00*    (2006.01)
  *B01J 31/00*    (2006.01)
(52) U.S. Cl. .............. 528/405; 502/151; 502/170
(58) Field of Classification Search ........ 502/151, 502/170; 528/405
See application file for complete search history.

(56) References Cited

U.S. PATENT DOCUMENTS

| 4,783,445 A | 11/1988 | Sun |
| 4,960,862 A | 10/1990 | Carroll et al. |
| 4,981,948 A | 1/1991 | Kawachi et al. |

FOREIGN PATENT DOCUMENTS

| JP | 2000-17067 A2 | 1/2000 |
| WO | WO 99/11694 A1 | 3/1999 |

OTHER PUBLICATIONS

Morrison and Boyd, Organic Chemistry 3rd Ed. (1974) pp. 668.*
Ree et al., "A New Copolymerization Process Leading to Poly (propylene carbonate) with a Highly Enhanced Yield from Carbon Dioxide and Propylene Oxide," Journal of Polymer Science; Part A: Polymer Chemistry, 37: 1863-1876 (1999).

* cited by examiner

*Primary Examiner*—Thomas McKenzie
*Assistant Examiner*—Raymond Covington
(74) *Attorney, Agent, or Firm*—JHK Law; Joseph Hyosuk Kim

(57) ABSTRACT

Disclosed is a method of preparing a catalyst for polymerization of an aliphatic polycarbonate including oxidizing a dicarboxylic acid precursor and a zinc precursor under a pressurized condition, and a method for polymerizing the aliphatic polycarbonate.

7 Claims, 4 Drawing Sheets

METHOD OF PREPARING CATALYST FOR POLYMERIZATION OF ALIPHATIC POLYCARBONATE AND METHOD OF POLYMERIZING ALIPHATIC POLYCARBONATE USING SAME

BACKGROUND OF THE INVENTION

1. Field of the Invention

The present invention relates to a method for preparing a catalyst for polymerization of aliphatic polycarbonates and a method for polymerizing aliphatic polycarbonates using the catalyst, and more particularly, to a method for preparing a catalyst for polymerization of an aliphatic polycarbonate exhibiting high catalyst activity.

2. Background of the Invention

Carbon dioxide from industrial activities, among atmospheric pollutants, has been known as one reason for climatic change according to UNFCCC, so various studies to reduce the amount of carbon dioxide produced have been undertaken all around the world. Therefore, in order to protect the environment and to use carbon dioxide, a method in which an epoxide reacts with carbon dioxide as a carbon source in the presence of a zinc-included catalyst to prepare an aliphatic polycarbonate has attracted attention.

The aliphatic polycarbonate is able to form a film or a particle, and has uses in many areas such as for ceramic binders, evaporation mold, and adhesives. However, this method has a low yield because of low carbon dioxide reactivity. Accordingly, it is difficult to use industrially, so it is required to prepare a catalyst exhibiting high efficiency for increasing the yield of the aliphatic polycarbonate.

Inoue teaches a method of polycarbonate production from carbon dioxide and epoxide in U.S. Pat. No. 3,585,168.

The Inoue catalyst system was prepared by the reaction of a diethylzinc catalyst with materials containing active hydrogen compounds, e.g., water, dicarboxylic acid, or dihydric phenols, and the typical catalyst productivities ranged from 2.0 to 10.0 grams of polymer per gram of catalyst used. The catalyst has shortcomings associated with use and storage, because of stability and sensitivity to moisture and to other catalyst poisons, and it has a low yield, so it has been required to study other catalyst systems.

Zinc dicarboxylic acid esters (Polymer J. 13(4), 407 (1981)) reported by Soga have also been described as effective catalysts for copolymerization of carbon dioxide and propylene oxide, and since these are stable materials with none of the handling problems associated with diethylzinc, they represent interesting candidates for a practical commercial catalyst system.

Motika (U.S. Pat. No. 5,026,676) teaches a method for preparing zinc dicarboxylic acid ester in which zinc oxide reacts with dicarboxylic acid in the presence of an organic solvent. Glutaric acid and adipic acid produced catalysts with higher activity than the known zinc dicarboxylic acid ester catalysts, and the catalyst production is about 2 to 26 grams of the aliphatic polycarbonate per gram of catalyst.

It has been reported that zinc dicarboxylic acid ester can be prepared by using various zinc precursors and high crystallinity increases yield per gram of catalyst (Ree. et al. J. Polym. Sci: Part A: Polym. Chem. 37, 1863 (1999)).

SUMMARY OF THE INVENTION

It is an object of the present invention to provide a method of preparing a catalyst for polymerization of an aliphatic polycarbonate having high efficiency.

It is another object of the present invention to provide a method of polymerizing an aliphatic polycarbonate using the catalyst, with a high yield.

These and other objects may be achieved by a method of preparing a catalyst for polymerization of an aliphatic polycarbonate, including oxidizing a dicarboxylic acid precursor and a zinc precursor under a pressurized condition.

In order to achieve these objects and others, the present invention provides a method of polymerizing an aliphatic polycarbonate, including copolymerizing alkylene oxide and carbon dioxide in the presence of a catalyst prepared by oxidizing a dicarboxylic acid precursor and a zinc precursor under a pressurized condition.

DETAILED DESCRIPTION OF THE INVENTION

Figure 1:
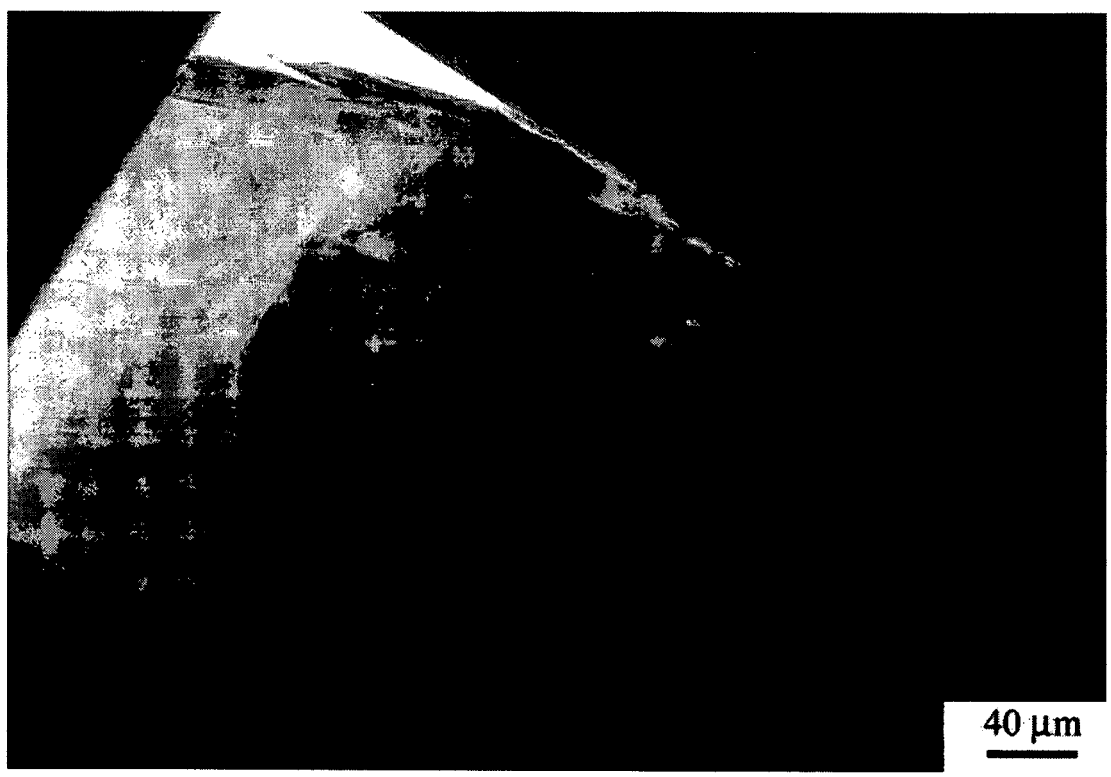
FIGS. 1 and 2 are optical microscope photographs of a catalyst according to Example 1 of the present invention.

The present invention relates to a method of preparing a zinc-included catalyst having good efficiency for preparing an aliphatic polycarbonate.

The inventive procedure includes oxidizing a dicarboxylic acid precursor and a zinc precursor under pressurized condition. One example of the procedure is shown in the following reaction formula 1. As shown in reaction formula 1, the dicarboxylic acid precursor oxidizes under a pressurized condition, to prepare a complex of the compound with a zinc precursor (hydrothermal reaction)

(Reaction Formula 1)

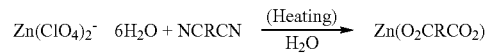

where R is $(CH_2)_x$ and where x is an integer of 0 to 10, e.g., phenyl, or naphthaloyl.

The useful zinc precursor may be anhydrous zinc acetate, zinc hydroxide, zinc nitrite, zinc perchlorate hexahydrate, zinc oxide, zinc sulfate, zinc acetate dihydrate or zinc nitrate hexahydrate. Preferred are zinc sulfate, zinc oxide, zinc perchlorate, zinc nitrite, zinc hydroxide, or zinc acetate dihydrate, which are readily complex with ligands.

The dicarboxylic acid precursor may be a compound in which halogen, cyanide, aldehyde, or an anhydrous functional group are presented at both terminal sites, and examples are aliphatic compounds with dihydroxyl groups, aromatic groups with dihydroxyl groups, dihalogenated alkanes, dihalogenated aromatic compounds, aliphatic compounds with dicyanide groups, aromatic dinitrile compounds, aliphatic compounds with di-amide groups or aliphatic compounds with dialdehyde groups.

Examples of the aliphatic compound are ethyleneglycol, propanediol, butanediol, pentanediol, hexanediol, octanediol, decandiol, or dodecandiol; and examples of the aromatic compounds with dihydroxyl groups are 1,2-benzenedimethanol, 1,3-benzenediemethanol, 1,4-bezenedimethanol, 1,2-naphtalene dimethanol, 1,3-naphtalene dimethanol, 1,4-naphtalene dimethanol, 1,5-naphtalene dimethanol, 1,7-naphtalene dimethanol, 1,8-naphtalene dimethanol, 2,3-naphtalene dimethanol, 2,5-naphtalene dimethanol, 2,6-naphtalene dimethanol, or 2,7-naphtalene dimethanol. In addition, examples of the dihalogenated alkanes are 1,2-dibromoethane, 1,2-dichloroethane, 1,3-dibromopropane, 1,3-dichoropropane, 1,4-dibromobutane, 1,4-dichlorobutane, 1,5-dibromopentane, 1,5-dichloropentane, 1,6-dichlorohexane, 1,6-dibromohexane, 1,8-dibromooctane, 1,8-dichlorooctane, 1,10-dichlorohecane, or 1,10-dibromodecane; and examples of dihalogenated aromatic compounds are α,α'-dichloro-o-xylene, α,α'-dichloro-m-xylene, α,α'-dichloro-p-xylene, α,α'-dibromo-o-xylene, α,α'-dibromo-m-xylene, or α,α'-dibromo-p-xylene. Examples of the aliphatic compounds with dicyanide groups are oxalnonitrile, malononitrile, succinonitrile, glutaronitrile, adiponitrile, 1,5-pentane dinitrile, 1,6-hexane dinitrile, 1,8-octane dinitrile, or 1,10-decane dinitrile; and examples of the aromatic dinitrile are 1,2-benzene dinitrile, 1,3-benzene dinitrile, 1,4-benzene dinitrile, 1,2-naphtalene dinitrile, 1,3-naphtalene dinitrile, 1,4-naphtalene dinitrile, 1,5-naphtalene dinitrile, 1,7-naphtalene dinitrile, 1,8-naphtalene dinitrile, 2,3-naphtalene dinitrile, 2,5-naphtalene dinitrile, 2,6-naphtalene dinitrile, or 2,7-naphtalne dinitrile. Examples of the aliphatic compounds with diamide groups are oxalic imide, malonic imide, succinic imide, glutamic imide, adipic imide, 1,5-diimide pentane, 1,6-diimide hexane, 1,8-diimide octane, or 1,10-diimide decane; and examples of the aliphatic compounds with dialdehyde groups are oxalic dialdehyde, malonic dialdehyde, succinic dialdehyde, glutaryldialdehyde, adipic dialdehyde, 1,5-dialdehydepentane, 1,6-dialdehyde hexane, 1,8-dialdehydeoctane, or 1,10-dialdehyde decane.

The dicarboxylic acid precursor is more preferably pentanediol, hexanediol, 1,5-dibromopentane, 1,5-dichloropentane, 1,6-dichlorohexane, 1,6-dibromohexane, glutaronitrile, adiponitrile, glutaamide, adipic amide, glutarylaldehyde, or adipic aldehyde.

The equivalent ratio between the zinc precursor and the dicarboxylic acid precursor is preferably 1:10 to 10:1, and more preferably 1:3 to 3:1. The oxidation is performed in water, preferably distilled water and the mixture is dissolved in water followed by addition to a pressurized reactor. The amount of the precursors is 0.1 to 50 volume % of water, and preferably 1 to 10 volume %.

Thereafter, the pressurized reactor is heated to a temperature between 120 and 180° C. whereby the distilled water is vaporized. The heating is continued for 1 to 40 hours, and preferably 20 to 40 hours to prepare a zinc-included catalyst, zinc dicarboxylic acid ester. It is generally known that such a hydrothermal synthesis makes products with unique crystallinity which cannot be obtained from general procedures.

The resulting catalyst is washed to increase purity. The pressurized reactor is cooled to room temperature and filtered to obtain a transparent mono-crystal precipitated material followed by washing with distilled water and acetone several times. The product is dried in a vacuum drying oven at room temperature.

The inventive zinc dicarboxylic acid ester obtained from the procedure is single crystalline with a uniform surface structure derived from its regularly arranged inner structure. Such uniformity of the surface structure allows it to exhibit high catalytic activity to copolymerization of carbon dioxide and alkylene oxide when compared with the conventional catalyst. Furthermore, such a single crystal renders preparation of aliphatic polycarbonates with constant yield and a narrow molecular-weight distribution during the copolymerization.

The use of water has no shortcomings associated with the use of organic solvents such as toluene that is used in the conventional procedure, so that the inventive procedure is environmentally friendly.

In the application, a detailed description regarding the method of production of aliphatic polycarbonates using the zinc dicarboxylic acid ester is not required in order to perform the present invention, because it is well known in the related arts, but one embodiment will be briefly illustrated. The produced catalyst is pulverized and the pulverized catalyst is added to alkylene oxide. Thereafter, carbon dioxide is injected into the mixture at a predetermined pressure (e.g. 300 psi) and the copolymerization occurs. When the copolymerization is completed, organic solvents such as methylene chloride are added to the resulting material and the obtained mixture is washed with diluted hydrochloric acid solution several times. The washed mixture is then washed with distilled water several times and precipitation is performed using methanol. The precipitated material is dried in a vacuum drying oven at room temperature to prepare an aliphatic polycarbonate.

The copolymerization is performed in the absence of organic solvents or in the presence of organic solvents such as 1,4-dioxane, toluene, benzene, methylene chloride, or cyclohexane. If the copolymerization is performed in the absence of organic solvents, the alkylene oxide or aliphatic cyclic ester which does not participate in the copolymerization but remains, acts as the solvent. When the copolymerization is completed, the remaining alkylene oxide and aliphatic cyclic ester is recovered and is reused.

The produced aliphatic polycarbonate preferably has a molecular weight of 500 to $5\times10^6$, which results in ready control of chemical or physical properties and forming properties.

The present invention is further explained in more detail with reference to the following examples, but the examples should not be construed as limiting the scope of the claimed invention.

EXAMPLE 1

Preparation of Catalyst 1 g of zinc perchlorate hexahydrate and 0.25 g of glutaronitrile were dissolved in 24 ml of distilled water. The resulting solution was injected into a pressurized reactor, the inside of which was treated with a Teflon film. The solution was held in the reactor at 160° C. for 40 hours.

Figure 2:
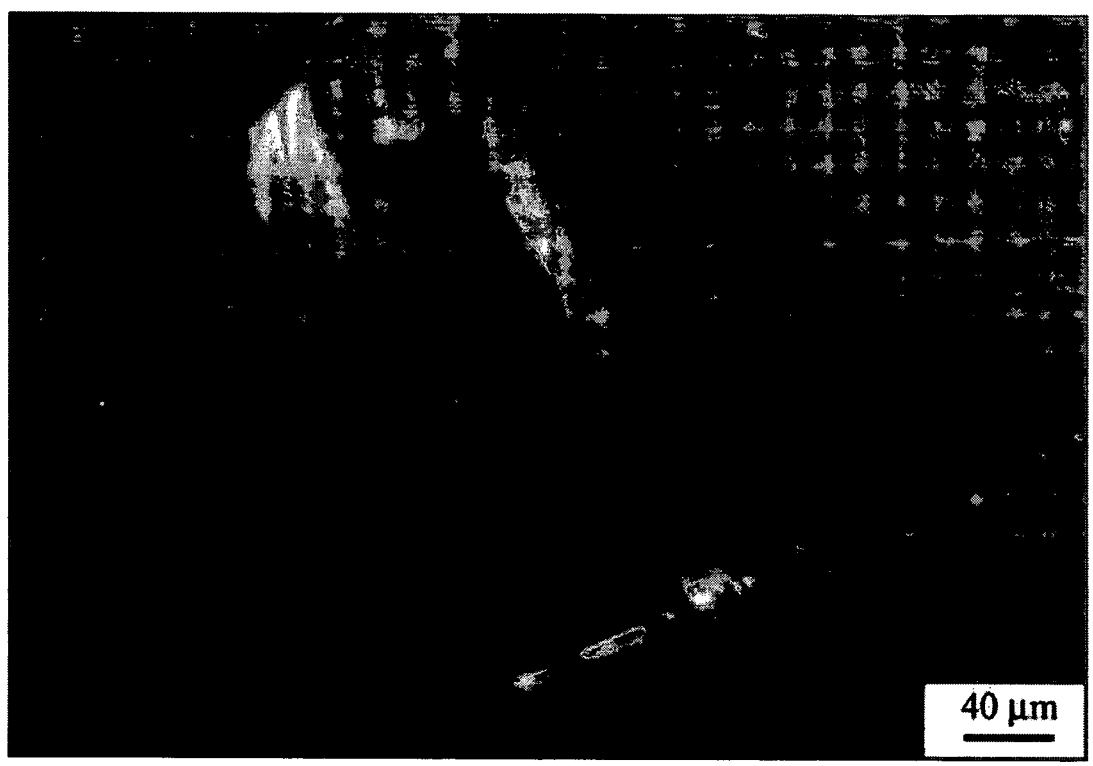
Figure 3:
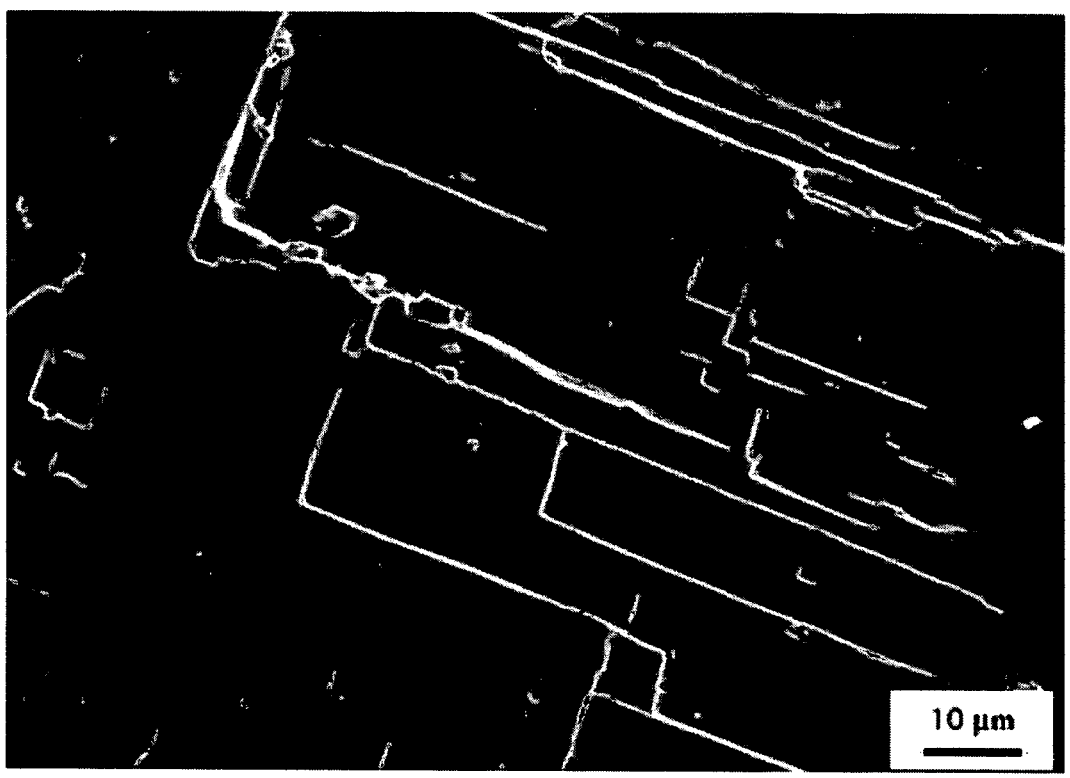
FIGS. 3 and 4 are SEM photographs of the catalyst according to Example 1 of the present invention.
Figure 4:

When the reaction was completed, the reactor was cooled to room temperature and the solution was filtered off to obtain a transparent crystal material as shown in FIGS. 1 to 4, followed by washing with distilled water and acetone three times or more. FIGS. 1 and 2 are optical microscope photographs of the resultant material and FIGS. 3 and 4 are SEM photographs thereof. It is evident from FIGS. 1 to 4 that the material has a transparent and shine crystal structure.

From the washed compound, residual solvent was removed under a condition of 50° C./5 mmHg to obtain 0.8 g of a catalyst. The elemental analysis of the catalyst was as follows: C: 30.72%, H, 3.08%, O: 32.52%.

Polymerization of Aliphatic Polycarbonate 1 g of the catalyst was placed in a pressurized reactor in a glove box under a nitrogen atmosphere, and 100 ml of propylene oxide was placed therewith. Thereafter, the reactor was pressurized to 300 psi with carbon dioxide. The reacted mixture was kept at 60° C. for 40 hours.

When the reaction was completed, carbon dioxide was removed from the reactant and methylene chloride was added thereto. The resulting material was washed with diluted hydrochloride acid solution three times, and then with distilled water to remove catalyst from the resulting material. Then, the material was precipitated using methanol. The obtained precipitated material was filtered and dried to obtain 50 g of propylene carbonate polymer.

Analysis using an infrared ray and nuclear magnetic resonance indicated that the polymer was a copolymer of propylene oxide and carbon dioxide with a 1:1 mole ratio.

EXAMPLES 2~4

A catalyst was prepared by the same procedure as in Example 1 except that the reacted mixture was kept for times as shown in Table 1. The yields of the catalyst are presented in Table 1.

TABLE 1

|  | Reaction time | Yield |
| --- | --- | --- |
| Example 2 | 10 hours | 23% |
| Example 3 | 20 hours | 52% |
| Example 4 | 30 hours | 67% |

EXAMPLE 5

A catalyst was prepared by the same procedure as in Example 1 except that 19 of zinc perchlorate hexahydrate and 0.5 g of glutaronitrile were used to obtain 0.75 g of zinc glutaric ester catalyst.

Polymerization of Propylene Carbonate

Using the catalyst, polymerization of propylene carbonate was performed by the same procedure as in Example 1 to obtain 41 g of polymer.

EXAMPLE 6

A catalyst was prepared by the same procedure as in Example 1 except that 0.29 g of adiponitrile was used to obtain 0.71 g of a zinc adipic ester catalyst.

Polymerization of Propylene Carbonate

Using the catalyst, polymerization of propylene carbonate was performed by the same procedure as in Example 1 to obtain 12 g of polymer.

COMPARATIVE EXAMPLE 1

A catalyst was prepared by the same procedure as in Example 1 except that the reaction temperature was kept at 110° C. In the procedure, a white powder was produced and the single crystalline product was not produced.

COMPARATIVE EXAMPLE 2

A catalyst was prepared by the same procedure as in Example 1 except that zinc chloride as a zinc precursor was used. In the procedure, a white powder was produced and the single crystalline product was not produced.

COMPARATIVE EXAMPLE 3

A catalyst was prepared by the same procedure as in Example 1 except that 20 ml of ethanol and 4 ml of distilled water were used. In the procedure, a white powder was produced and the single crystalline product was not produced.

It is predicted that when amorphous compounds according to Comparative Examples 1 to 3 are used to prepare aliphatic polycarbonate, the yield is lower than that according to Examples 1 to 6.

As described above, the method of the present invention can prepare a single crystalline catalyst of which high crystallinity allows an increase in the catalyst activity, and which is useful as a commercial catalyst for production of aliphatic polycarbonate, and the method is environmentally friendly without the use of organic solvent. The obtained polycarbonate can be formed as a film or particle, and it is applied to a ceramic binder, an evaporation mold or a binder. In addition, the method uses carbon dioxide as a monomer so that atmospheric pollution and climate change due to carbon dioxide can be controlled.

What is claimed is:

1. A method of preparing a single crystalline catalyst for polymerization of an aliphatic polycarbonate, comprising:
   oxidizing a dicarboxylic acid precursor and a zinc precursor under a pressurized condition in water, wherein the dicarboxylic acid precursor is selected from the group consisting of pentanediol, 1,5-dibromopentane, 1,5-dichloropentane, glutaronitrile, glutamic imide, and glutaryldialdehyde.

2. The method of claim 1, wherein the equivalent ratio of the zinc precursor and the dicarboxylic acid precursor is 1:3 to 3:1.

3. The method of claim 1, wherein the oxidation is performed at a temperature between 120 and 180° C.

4. The method of claim 1, wherein the dicarboxylic acid precursor and the zinc precursor are respectively 0.1 to 50 volume % of water.

5. The method of claim 4, wherein the dicarboxylic acid precursor and the zinc precursor are respectively 1 to 50 volume % of water.

6. The method of claim 1, wherein the zinc precursor is selected from the group consisting of zinc acetate dihydrate, zinc hydroxide, zinc nitrate hexahydrate, zinc perchlorate hexahydrate, zinc oxide and zinc sulfate.

7. A method of polymerizing an aliphatic polycarbonate, comprising:
   copolymerizing alkylene oxide and carbon dioxide in the presence of the catalyst which is prepared according to the method of claim 1.

* * * * *